C. E. WILLEY.
AUTOMOBILE OR TRAIN LIGHTING SYSTEM.
APPLICATION FILED MAR. 28, 1913.
1,143,008.
Patented June 15, 1915.
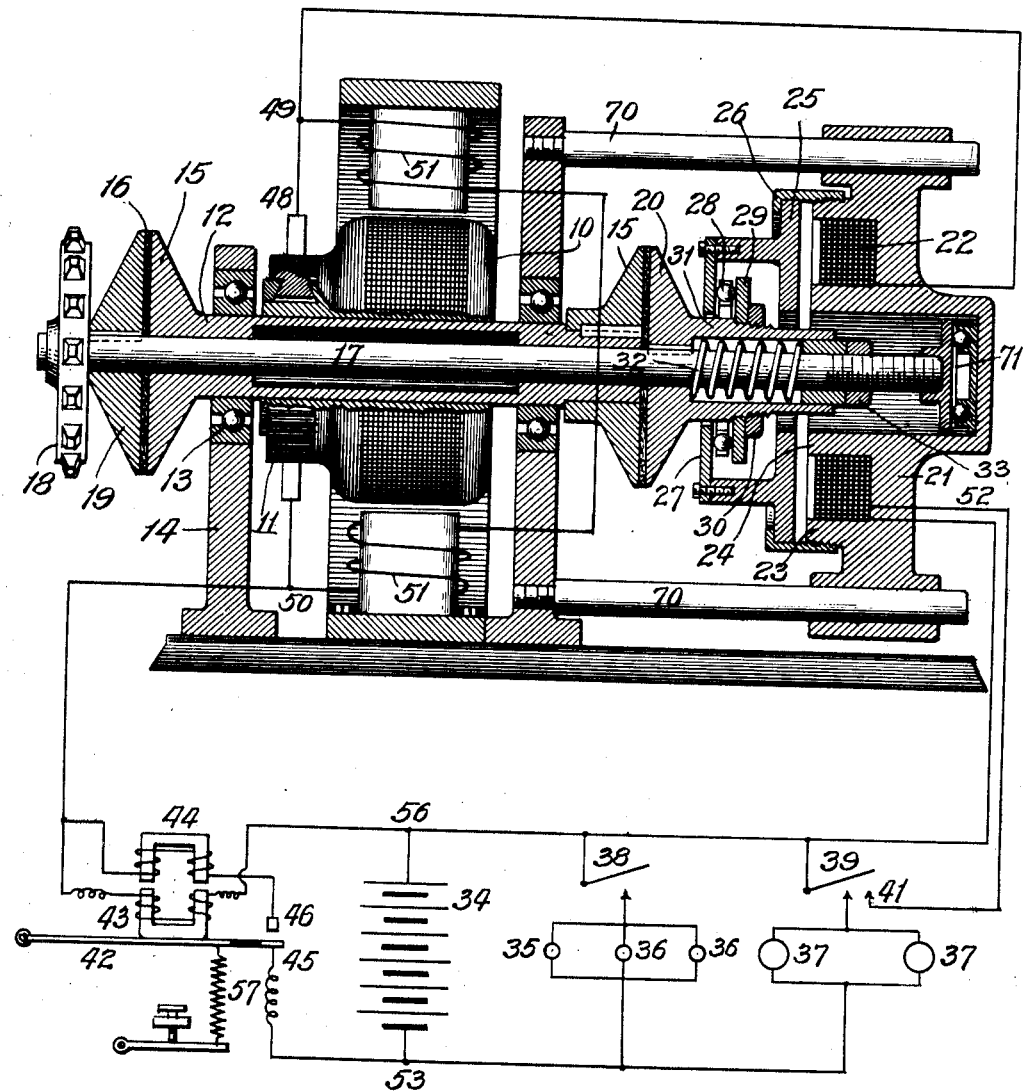
Witnesses:
John Enders
E. M. Anderson
Inventor:
Charles E. Willey
by Sheridan, Wilkinson, Scott & Richmond
Attys

UNITED STATES PATENT OFFICE.

CHARLES E. WILLEY, OF LOUISVILLE, KENTUCKY, ASSIGNOR TO JAS. CLARK, JR., ELECTRIC CO., OF LOUISVILLE, KENTUCKY, A CORPORATION OF KENTUCKY.

AUTOMOBILE OR TRAIN LIGHTING SYSTEM.

1,143,008. Specification of Letters Patent. Patented June 15, 1915.

Application filed March 28, 1913. Serial No. 757,425.

*To all whom it may concern:*

Be it known that I, CHARLES E. WILLEY, a citizen of the United States, residing at Louisville, in the county of Jefferson and State of Kentucky, have invented certain new and useful Improvements in Automobile or Train Lighting Systems, of which the following is a specification.

The principal object of my invention is to provide a new and improved system for generating electrical current and utilizing the same, the generator to be driven from a variable speed source of power.

Another object of my invention is to provide a system of electric lighting for automobiles comprising a storage battery, generator, and electromagnetic means for checking the speed of the generator when it tends to become too fast.

These and other objects of my invention will be made apparent in the following specification and claims, taken in connection with the accompanying drawing.

In this drawing I have illustrated diagrammatically one specific embodiment of my invention, but it will be understood that the invention is defined in the appended claims.

Referring to this drawing, the generator armature 10 is of the direct current type and has the commutator 11 engaged by the brushes 48. This armature 10 is mounted on the tubular shaft 12, which is supported by ball-bearings 13 in the pedestals 14. At its ends the tubular shaft 12 is broadened out into friction disks 15 each faced with asbestos cloth 16. Within the tubular shaft 12 is the solid shaft 17 driven by a sprocket wheel 18 and having fixed thereon the friction disk 19 opposed to one of the disks 15. At the other end the shaft 17 carries a friction disk 20 slidably, but non-rotatively, engaging said shaft 17.

An electromagnet 21 is provided having annular poles 23 and 24 between which is an annular channel containing the ring-like winding 22. This electromagnet 21 is mounted on the bars 70 so that it may be displaced laterally. The armature 25 for the electromagnet 21 is of annular shape and is guided and limited in its movement by the flanged cap 26. This armature 25 carries a ring-plate 27, which acts through the ball-bearings 28, upon the ring-plate 29, which is secured by a lock-nut 30 on the hollow hub 31 of the friction disk 20. A coil spring 32 surrounds the shaft 17 within the hub 31 and is retained by the nut 33 on the shaft 17. The normal action of the spring 32 is to keep the friction disks 20, 15 and 19, 15 in engagement. The magnet 21 carries a thrust bearing 71 engaged by the end of the shaft 17.

The storage battery 34, side lamps 36, rear lamps 35, and head lights 37 of the automobile are all indicated diagrammatically in the drawing. The side and rear lamps 36 and 35 are controlled by the hand switch 38 and the head lights 37 are controlled by the hand switch 39, which is adapted to simultaneously shunt certain coils of the magnet winding 22, as will be presently described.

The circuit connections will be readily understood from the diagram and will be further explained in connection with the following description of the operation of the apparatus.

When the device is idle in normal condition the circuit of the storage battery 34 is open at 45—46, 38 and 39, and the clutches are in engagement. When the automobile starts, it causes the sprocket wheel 18 to rotate and with it the armature 10. It will be seen that the generator is of the shunt wound type, the field coils being designated 51. The current is delivered to an external circuit which may be traced as follows: 49—22—56—43—50. This energizes the magnet 43, causing a mutual attraction between the magnets 43 and 44. The magnet 43 is carried by the pivoted arm 42 and the attraction of the magnet 43 to the magnet 44 closes the contacts 45 and 46. This occurs only when the armature 10 has attained a sufficient speed to generate the voltage for which the cut-out is adjusted. This adjustment is made through the spring 57. After the cut-out closes the contacts 45, 46 the load current will flow through the winding of the magnet 44, tending to reinforce the magnet 43 and hold the contacts 45—46 firmly together. The winding of the magnet 44 is of high resistance.

Of course, as the speed of the automobile increases, the speed of the sprocket wheel 18 increases correspondingly, and this would have a tendency to increase the current to an undesirable value. But it will be seen that all the current is traversing the winding 22 of the magnet 21 and this increasing current is causing an increasing pull upon the armature 25. This pull on the armature 25 acts, through the ball-bearings 28, against the spring 32 and eventually relaxes the pressure by which the clutch members 15, 20 and 15, 19 engage each other, thus permitting the clutches to slip and prevent the armature 10 from rotating at an excessive speed.

It will be seen that when the device is standing idle, any closure of the switches 38 or 39, or both, simply connects them to the storage battery 34 from which they are supplied.

When the generator is in operation, then a closure of the switch 38 supplies the side and rear lamps 36 and 35 from the generator and the storage battery in multiple, or if the charge of the storage battery 34 is weak at the time, then upon closure of the switch 38, the generator acts to deliver current to the said lamps 36 and 35 and the battery 34 in multiple.

When the head lights 37 are thrown on, this increases the load and makes it desirable that the capacity of the generator should be somewhat increased. Therefore, I provide a tap 52 going from an intermediate point of the magnet winding 22 to the switch terminal 41 to be engaged by the switch 39, so that when the switch 39 is closed, it will cut out a few turns of the magnet winding 22 and thereby relatively weaken the magnet 22 a little. This will relax the pull of the magnet 22, allowing greater effect to the spring 32 which will keep the clutches in engagement until a larger critical current is delivered by the generator.

It will be seen that I have provided a very simple device, automatic in its operation, by which a power source of variable speed, as for example an automobile engine, may be utilized to charge a storage battery and carry a lighting load in conjunction therewith.

I claim:

1. In combination, an electric generator, a tubular shaft on which the rotor of said generator is mounted, a variable speed drive shaft within said tubular shaft, coacting clutch members carried by said tubular shaft and said drive shaft at both ends of the tubular shaft, a spring normally holding said clutch members in engagement, an electromagnet acting in opposition to the spring, and electric circuit connections from said generator to said electromagnet.

2. In combination, an electric generator, a tubular shaft on which the rotor of said generator is mounted, transverse friction clutch members fixed in the ends of said shaft, a variable speed drive shaft within said tubular shaft, transverse friction clutch members carried by said drive shaft and adapted to co-act respectively with those carried by said tubular shaft, a spring normally holding said clutch members in engagement, an electromagnet acting against the spring, and electric circuit connections from said generator to said electromagnet.

3. In combination, an electric generator, a variable speed shaft in alinement with the rotor axis, clutch members carried respectively by the rotor and by the said shaft, a compression spring around said axis acting to thrust said clutch members together, an annular electromagnet also around said axis and adapted to act against said spring, and circuit connections from said generator to said electromagnet.

4. In combination, a tubular shaft mounted to rotate in suitable bearings and having clutch disks at its ends, an electric generator having its rotor carried by said shaft, a variable speed drive shaft within said tubular shaft having two clutch disks mounted thereon so as to rotate therewith, said clutch disks being relatively movable longitudinally of the shaft, a helical spring around the shaft tending to push the clutch disks into engagement, an electromagnet, an armature therefor engaging one of the clutch disks carried by the drive shaft, and electric circuit connections from said generator to said electromagnet.

In testimony whereof, I have subscribed my name.

CHARLES E. WILLEY.

Witnesses:
L. H. BRUNING,
M. PERRY.